United States Patent
Christ et al.

(10) Patent No.: US 7,182,709 B2
(45) Date of Patent: Feb. 27, 2007

(54) PLANETARY GEAR, GEAR MOTOR AND SERIES OF GEAR MOTORS

(75) Inventors: Michael Christ, Karlsdorf-Neuthard (DE); Heinrich Zimmermann, Bruchsal (DE); Jürgen Kasper, Lingenfeld (DE)

(73) Assignee: Sew-Eurodrive GmbH & Co. KG (DE)

( * ) Notice: Subject to any disclaimer, the term of this patent is extended or adjusted under 35 U.S.C. 154(b) by 0 days.

(21) Appl. No.: 10/498,425

(22) PCT Filed: Nov. 16, 2002

(86) PCT No.: PCT/EP02/12871

§ 371 (c)(1),
(2), (4) Date: Jun. 11, 2004

(87) PCT Pub. No.: WO03/050434

PCT Pub. Date: Jun. 19, 2003

(65) Prior Publication Data

US 2005/0085324 A1    Apr. 21, 2005

(30) Foreign Application Priority Data

Dec. 11, 2001  (DE) ................................ 101 60 685

(51) Int. Cl.
*F16H 57/08* (2006.01)

(52) U.S. Cl. ........................................ 475/348; 475/331
(58) Field of Classification Search ................ 475/317, 475/4, 5, 331, 348, 903; 180/65.6, 65.7
See application file for complete search history.

(56) References Cited

U.S. PATENT DOCUMENTS

| | | | | |
|---|---|---|---|---|
| 4,019,406 A | * | 4/1977 | Herr | 475/66 |
| 4,204,436 A | * | 5/1980 | Heaton | 475/337 |
| 5,685,796 A | * | 11/1997 | Chen et al. | 475/320 |
| 6,125,717 A | * | 10/2000 | Phillips | 74/606 R |
| 6,432,022 B1 | * | 8/2002 | Bayer | 475/331 |
| 6,503,168 B2 | * | 1/2003 | Chang | 475/348 |
| 6,824,495 B1 | * | 11/2004 | Kirschner | 475/348 |

(Continued)

FOREIGN PATENT DOCUMENTS

DE        26 49 949        11/1977

(Continued)

OTHER PUBLICATIONS

Planetgear Speed Reducers: Neptune/saturn/titan Owners'Manual, Mar. 2001, Bulletin #88-PG09, Rexnord Corporation, Milwaukee, Wisconsin, USA.*

*Primary Examiner*—Charles A. Marmor
*Assistant Examiner*—J K H
(74) *Attorney, Agent, or Firm*—Kenyon & Kenyon LLP

(57) ABSTRACT

A series of gear motors, a gear motor, and a planetary-gear stage includes planet wheels that mesh with a sun wheel and inner gear teeth provided for the gear housing. The planet wheels are supported in a rotatable planet carrier, which forms the power take-off, and to which a sealing element is assigned on the output side. The planetary-gear stage is assigned a further sealing element on the input side. The gear housing is shaped on the input side such that an interface is formed for connection to further components, which include at least one shaft connected to the sun wheel.

18 Claims, 5 Drawing Sheets

U.S. PATENT DOCUMENTS

| | | | |
|---|---|---|---|
| 2004/0166986 A1* | 8/2004 | Bayer et al. | 475/331 |
| 2004/0235609 A1* | 11/2004 | Chang | 475/331 |
| 2006/0035745 A1* | 2/2006 | Wittenstein et al. | 475/331 |
| 2006/0035746 A1* | 2/2006 | Griggs et al. | 475/331 |

FOREIGN PATENT DOCUMENTS

| | | |
|---|---|---|
| DE | 35 02 015 | 7/1986 |
| DE | 196 47 063 | 5/1998 |
| DE | 199 56 789 | 5/2001 |
| EP | 0 567 048 | 10/1993 |
| EP | 0 687 837 | 12/1995 |

* cited by examiner

PLANETARY GEAR, GEAR MOTOR AND SERIES OF GEAR MOTORS

FIELD OF THE INVENTION

The present invention relates to a planetary gear, a gear motor, and a series of gear motors.

BACKGROUND INFORMATION

German Published Patent Application No. 199 56 789 describes a planetary gear, which is designed to be attached to an electric motor and has a compact construction. In particular, a sealing element, which seals the sun-wheel shaft from the external space, is situated on an outer diameter that is reduced in comparison with the receiving region for the output shaft of the electric motor, which means that the heat generation may be reduced. In this context, it may be disadvantageous that the bearing for the sun-wheel shaft is far away from the motor to be attached. In addition, it may be difficult and expensive to satisfactorily true the output shaft for the planetary gear. And, despite the reduction in diameter, the heat generation in the sealing element and bearing 28 is considerable at high input speeds, such as those which often occur in servo drive units. It may also be disadvantageous that the sealing element is difficult to lubricate, since it is separated from the interior of the gear by bearing 28. The planet carrier does form a bearing seat for bearing 30, but it is interrupted, because the bores for the planet bolts must be provided. This may have a negative effect on the rigidity and torsional stiffness. The planet carrier is supported against the gear housing and therefore requires a large, expensive bearing 30. Since bearings 30 and 32 are positioned in the shape of an X, the imaginary bearing spacing of bearings 30 and 32 is small, and, therefore, only correspondingly small, transverse forces are allowed. In the case of low gear ratios i, i.e., a large sun gear, it may be difficult and, under some circumstances, even impossible to mount the sun gear.

It is an aspect of the present invention to provide a planetary gear, which may be used for connection to an electric motor, which may have a compact construction, and which may be more efficient and/or powerful. In addition, the planetary gear may be more cost-effective in view of overall economics, as well as simple to manufacture, without requiring high expenditure.

SUMMARY

The above and other beneficial aspects of the present invention may be achieved by providing a planetary gear having the features described herein, by providing a gear motor having the features described herein, and by providing a series of gear motors having the features described herein.

In the case of the gear stage and the gear containing this gear stage, features include a planetary-gear stage, which includes planet wheels that mesh with a sun wheel and inner gear teeth provided for the gear housing, the planet wheels being supported in a rotatable planet carrier, which forms the power take-off, and to which a sealing element is assigned on the output side, the planetary-gear stage being assigned a further sealing element on the input side, and the gear housing being shaped on the input side in such a manner, that an interface is formed for connection to other components, which include at least one shaft connected to the sun wheel.

In this context, an interface for connection to further components may be provided. Thus, the planetary-gear stage may be connected to different electric motors, couplings, clutches or other gear stages, etc. This may allow the planetary-gear stage to be used in different variants within a size of the series. In this manner, a reduction in the number of separate parts may be achieved, and the cost of producing the planetary-gear stage and the corresponding series may be reduced. In view of the fact that the gears are assembled all over the world, a reduction in the variety of parts may be desired. It may also be provided that the overall length is reduced, since the connectible components are adapted and adjusted to each other, which means that, e.g., savings of housing parts and optimization of the mass moment of inertia are possible.

Input bearings and shaft sealing rings are situated on a reduced diameter. This may reduce the bearing and seal power losses and consequently may reduce the heat generation.

Thus, the foregoing may allow the manufacture of one-stage and also two-stage planetary gears for robots and manipulators, which require compact and high-capacity drive units that may be driven at high speeds.

In an example embodiment, the further component takes the form of a clutch that includes a clutch shaft, an electric motor including a rotor shaft, or a further gear stage, which includes a planet carrier that takes the form of a shaft in the direction of the planetary-gear stage. In this context, it may be provided that different components are connectible, and that the variety of parts may therefore be reduced while retaining a large variance in the series, i.e., a unit assembly system having all of the corresponding advantages may be provided, and, e.g., storage costs may be reduced.

In an example embodiment, the further sealing element assigned to the planetary-gear stage on the input side is positioned on the shaft surrounded by the component; the diameter of the shaft in the region of the sealing element being reduced in comparison with the diameter of the shaft in a region the situated axially further to the input side. In this context, it may be provided that the heat generation is reduced, and that the gear may therefore be used, e.g., in a servo drive unit in high-dynamics operation and at high speeds. In addition, the sealing element may be designed to be smaller and, therefore, less expensive, since it may only be constructed for lower speeds, at a smaller diameter.

In an example embodiment, the region lying axially further on the input side is the receiving region for the rotor shaft, a region of the rotor shaft in the interior of the electric motor, and/or a region of the planet carrier in the further gear stage, the region axially further towards the input side, and the planet carrier taking the form of a shaft. In this context, it may be provided that the mentioned reduction in diameter for the sealing element, in comparison with this region lying axially further on the input side, is possible, for the diameter of this region is determined by the technical requirements of the further component, such as the maximum torque to be transmitted, the maximum allowable shear force, etc. That the positioning of the sealing element on a diameter, which is reduced in comparison with this diameter defined and obtained by force in this manner, is possible, may be advantageous, due to the heat generation.

In an example embodiment, the housing of the further component has a seat for the inner ring of the input-side bearing of the gear stage, and the corresponding outer ring of this bearing is situated in the planet carrier. In this context, it may be provided that, by appropriately shaping the housing of the further component, the bearing may be designed to be smaller, and the overall length of the gear may be reduced.

In an example embodiment, the output-side sealing element of the gear stage is axially positioned more on the output side than the output-side, power-takeoff bearing, i.e., in the interior of the gear, as seen from the power-takeoff bearing. In this context, it may be provided that a sealed bearing may be used as a power-takeoff bearing, and that the sealing element may be effectively provided with lubricant, since the interior of the gear stage sufficiently contains lubricant.

In an example embodiment, the input-side sealing element of the gear stage is axially positioned more towards the output side than the input-side power-takeoff bearing. In this context, it may be provided that effective sealing from the environment is also achieved for the power-takeoff bearing.

In an example embodiment, the planet carrier is supported on the input side by a bearing in the housing part of the planetary-gear stage, and supported on the output side by a bearing in the housing part of the further component. In this connection, it may be provided that the gear may be designed to have a very short overall length, i.e., is very compact.

During the manufacture of the further component, an example embodiment may provide for the bore for the shaft of this component, the bearing seat of the bearing supporting this shaft, the bearing seat for the inner ring of the bearing supporting the planet carrier in the housing part of the further component, and the region of the housing part provided for forming the interface to be machined in a clamp or chuck. During the manufacture of the planetary-gear stage, an example embodiment may provide for the bearing seat for the outer ring of the bearing supporting the planet carrier in the housing part of the planetary-gear stage, and the region of the planetary-gear-stage housing part provided for forming the interface to be machined in a clamp. In this context, it may be provided that it is possible to achieve as high a manufacturing precision as possible while keeping costs as low as possible. In addition, the tolerances may be optimized, the dynamic-balance characteristics of the gear may be improved, and it may be possible to assemble the foregoing worldwide, using the final machining performed at one location by highly precise machine tools.

In the case of the series of gear motors, features include that the series includes at least one size, the sizes each having at least one variant, the variants each having at least one electric motor and one or more gear stages, at least one gear stage being designed to be a planetary-gear stage, and the gear stages each having an interface on the input side, so that a further component having a correspondingly formed interface on the output side is connectible. In this context, it may be provided that the unit construction principle is only rendered possible by the construction of an interface, which means that the reduction of the variety of parts are realizable, while retaining high variance and low costs.

In an example embodiment, the further component is a gear stage, a clutch, or an electric motor. In this context, it may be provided that, using the clutch, not only a manufacturer's own electric motors, but also electric motors convention in industry may be connectible. Thus, the described construction kit or modularity may also be used for generally available motors. However, a much more compact drive unit may be produced by selecting the manufacturer's own motors provided with the interface.

In the case of the specific variant for the planetary-gear stage, an example embodiment provides for the sun wheel to be connected on the input side to a shaft of the further component, by a plug-in pinion or a plug-on pinion, as a function of the gear ratio. In this context, it may be provided that the gearing may be so highly variable within the same housing, that a wide range of gear ratios may be realizable.

In an example embodiment, a variant of the electric motor, e.g., a standard motor conventional in industry, is constructed to have a different interface on the output side, in particular an interface standardized according to NEMA or IEC, and is connectible to the gear stage via a clutch, the clutch belonging to the additional components. In this context, it may be provided that standardized motors are connectible via the clutch, and, therefore, a series may be manufacturable, which also includes drive units that may be produced with motors conventional in industry and a manufacturer's own special motors.

Therefore, a series of drive units may be provided, whose variants have a high, maximum allowable, transverse force and an increased torsional stiffness.

Further aspects and example embodiments are described below.

LIST OF REFERENCE NUMERALS

| | |
|---|---|
| 101, 201, 301, 401, 4011, 5011 | planet carrier |
| 102, 202, 302, 402, 4021, 5021, 5022 | gear housing |
| 103, 203, 303, 403, 503 | power-takeoff bearing A |
| 104, 204, 304, 4041, 4042, 5041, 5042 | planet bolt |
| 105, 205, 305, 4051, 4052, 5051, 5052 | planet wheel |
| 107, 207, 307, 407, 507 | power-takeoff bearing B |
| 112, 212, 312, 412, 512 | radial shaft seal for the power takeoff |
| 113, 213, 313, 4131, 4132, 5131, 5132 | planet bearing |
| 114, 214, 314, 4141, 4142, 5141, 5142 | sealing location |
| 115, 315, 4151, 4152 | feather key |
| 116, 316, 4161, 4162 | sun wheel (plug-on pinion) |
| 117 | clutch shaft |
| 118 | clamping ring |
| 119, 219, 319: | radial shaft seal |
| 120 | clutch bearing |
| 121 | clutch housing |
| 122, 123, 422, 522 | retaining ring |
| 124 | sealing washer |
| 125 | shaft washer |
| 126, 226, 326 | sealing plug |
| 206, 506, 5061 | sun wheel (plug-in pinion) |
| 208, 321, 508 | A-end shield of the motor |
| 210, 310, 410, 510 | A-bearing of the motor |
| 211, 511 | motor shaft for plug-in pinion |
| 311, 411 | motor shaft for plug-on pinion |
| 4191, 5191 | bearing |
| 4022 | housing part |
| 4012 | planet-carrier shaft |

Example embodiments of the present invention are explained in detail with reference to the appended Figures.

DETAILED DESCRIPTION

Figure 1:
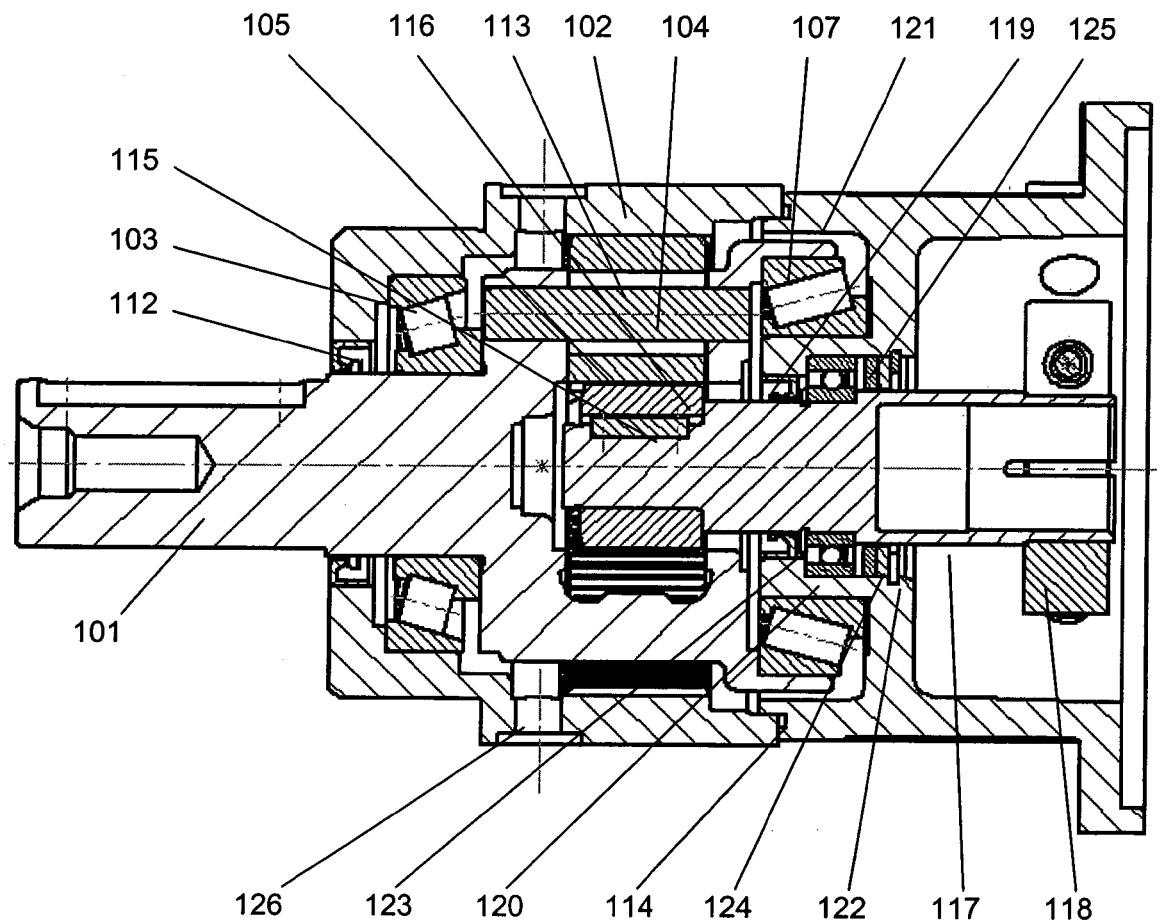
FIG. 1 illustrates the attachment of an electric motor conventional in industry, using a clutch.

Shown in FIG. 1 is an exemplary embodiment of a single-stage variant of the series. Output-side planet carrier 101 is supported in gear housing 102 by power-takeoff bearing 103 and is driven by planet bolts 104 that support planet bearing 113. Planet wheels 105 supported on planet bearings 113 mesh with sun wheel 106, which, as a slip-on pinion, is form-locked to the motor shaft by a feather-key connection 115. Power-takeoff bearing B 107 inwardly supports planet carrier 101 in clutch housing 121 of the motor. Therefore, power-takeoff bearing B 107 acts on a smaller diameter and is therefore designed to be smaller, more compact, and more cost-effective than those that are conventional.

Clutch bearing 120, which braces clutch shaft 117 against clutch housing 121, also lies in the same axial region as the receiving region of power-takeoff bearing B 107. This clutch bearing 120 is seated on a diameter, which is reduced in comparison with the diameter of the clutch shaft in the receiving region of the motor shaft. Clamping ring 118 is attached or mounted in the receiving region of the motor shaft, in order to connect the motor shaft to clutch shaft 117 in a force-locked manner.

Retaining ring 122 safeguards the axial movement of clutch bearing 120 via sealing washer 124 and shaft washer 125. Thus, clutch bearing 120 is additionally sealed by the sealing washer, clutch bearing 120 being able to be constructed as a sealed bearing, or also as a standard bearing. Shaft washer 125 compensates for thermally-caused, linear expansion in the axial direction and therefore protects the bearing from axial forces that are too high.

As a sealing element, radial shaft seal 119 of the clutch shaft is positioned behind clutch bearing 120 in the interior of the gear. Therefore, it is seated on a diameter, which is reduced in comparison with the diameter of clutch shaft 117 in the receiving region of the motor shaft.

A radial shaft seal 112, which protects power-takeoff bearing A 103 from dirt and prevents lubricant from leaking out, is provided on the output side as a sealing element. In this manner, power-takeoff bearing A 103 may also be continually and effectively supplied with lubricant.

Clutch housing 121 is connected to gear housing 102 via a sealing location 114. Gear housing 102 is formed with this sealing location 114 as an interface, so that, in the case of all variants, this is formed in a substantially identical manner within the size. Therefore, not only the clutch shaft shown in FIG. 1 is attachable, but rather any other device as well, which has an appropriate interface. In the further figures, this option is demonstrated on exemplary embodiments. Therefore, this interface forms a construction kit, which allows a large variety, while keeping the number of parts low.

In the exemplary embodiment illustrated in FIG. 1, gear housing 102 has inner gear teeth, with which planet wheels 105 mesh. In another exemplary embodiment, a special ring gear is provided, which is built into gear housing 102 and connected to it in a force-locked and/or form-locked manner. Therefore, gear housing 102 is provided with or without integrated gear teeth as a function of the number of variants in the size, or of the quantity produced altogether, in accordance with economic efficiency and customer demands, such as the range of gear ratios to be provided.

In FIG. 1, power-takeoff bearing A 103 and power-takeoff bearing B 107 are provided in a tandem arrangement. This allows the imaginary bearing spacing to be very large, which is why the maximum allowable, transverse force of the gear is large.

Planet carrier 101 forms an uninterrupted bearing seat for power-takeoff bearing B 107. Therefore, a high rigidity and torsional stiffness are realizable. The outer ring of power-takeoff bearing B 107 is seated in planet carrier 101. The corresponding inner ring is seated on a smaller radius on clutch housing 121. Therefore, power-takeoff bearing B 107 is smaller and, consequently, more cost-effective to manufacture in comparison with the conventional arrangement mentioned above.

Sealing plug 126 is used for removing oil and therefore allows an oil change.

An example embodiment of the present invention relates to a series, which contains several sizes that include several variants. The interface containing sealing location 114 may allow different components to be connected.

In FIG. 1, a clutch shaft 117, which has a clutch housing 121 and its own clutch bearing 120, is provided as a connectible component. Clutch shaft 117 is connected to the sun gear by a feather key, the sun gear taking the form a plug-on pinion. A motor shaft is connectible to this clutch shaft 117 on the input side, using clamping ring 118.

Figure 2:
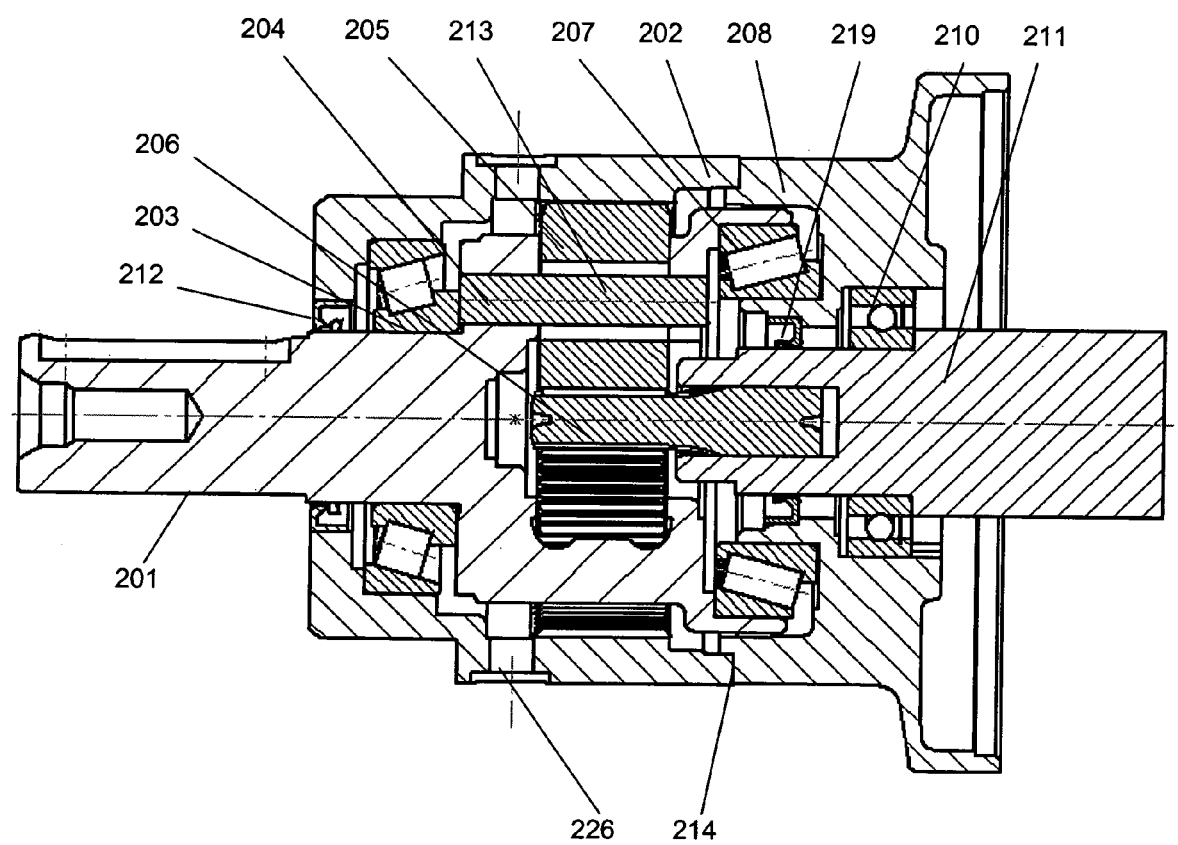
FIG. 2 illustrates the direct attachment of a manufacturer's own electric motor, using a plug-in pinion.

In FIG. 2, an electric motor, which has the interface containing sealing location 214, on its housing, i.e., on A-end shield 208 for the motor, is connected as a connectible component, in place of clutch shaft 117. Therefore, clutch bearing 120 may be superfluous, and A-bearing 210 for the motor is sufficient for supporting the electric motor. The gear, together with the electric motor, only has power-takeoff bearing A 203 and power-takeoff bearing B 207, as well as A-bearing 210 for the motor and an additional bearing, which is for supporting the rotor. Therefore, one bearing may be dispensed with, the efficiency may be increased, and the heat generation may be reduced. Shaft sealing ring 219 is seated on a diameter, which is reduced in comparison with the diameter of the rotor in the motor. Radial shaft seal 219 of the clutch shaft is also seated on a reduced diameter, and its heat generation may therefore be reduced. Sun wheel 206 takes the form of a plug-in pinion and is connected to the rotor in a bore of the rotor. On the side of the gear, A-end shield 208 of the motor may be shaped similarly to clutch housing 121, in order that power-takeoff bearing B 207 is received in a similar manner with the same seat as in FIG. 1. Therefore, power-takeoff bearing B 207 may be small in this case, may therefore be inexpensively manufactured, and may generate little heat.

Sealing plug 226 is used for removing oil and therefore allows an oil change.

In all of the figures, the components, planet carrier 101, 201, 301, 401, 4011, 5011, gear housing 102, 201, 301, 401, 4011, 5011, power-takeoff bearing A 103, 203, 303, 403, 503, planet bolt 104, 204, 304, 4041, 5041, planet wheel 105, 205, 305, 4051, 5051, power-takeoff bearing B 107, 207, 307, 407, 507, radial shaft seal for the power takeoff 112, 212, 312, 412, 512, planet bearing 113, 213, 313, 4131, 5131, sealing location 114, 214, 314, 4141, 5141, and sealing plug 126, 226, 326 may be substantially identical. Therefore, an inventory of the specific part may only be kept for each size, and not for all variants in all of the sizes. This may reduce the costs for the series.

Therefore, the planetary gear according to FIG. 2 may be well-suited for direct attachment of appropriately shaped electric motors. In particular, this may allow a manufacturer to provide and offer a series of motors, which may be combined with the shown planetary gear. The gear motor manufacturable in this manner may be especially compact and inexpensive, and may be as ideally adjusted and efficient or powerful as possible, and it may only require the four mentioned bearings having the corresponding features. However, this may bind the customer to the corresponding manufacturer and its components available in the series. As a result of this requirement and other requirements, such as special designs, etc., there may also be the need to be able to connect motors to the gear, which are obtainable on the market and conventional in industry, even when individual technical data are worsened. With the aid of the gear unit of an example embodiment of the present invention, this may be feasible and particularly simple. Since the gear unit has the described interface to the motor, the clutch shaft of FIG. 1 is also connectible. However, this provides the option for motors conventional in industry to be attached with the aid of clamping ring 118.

Figure 3:
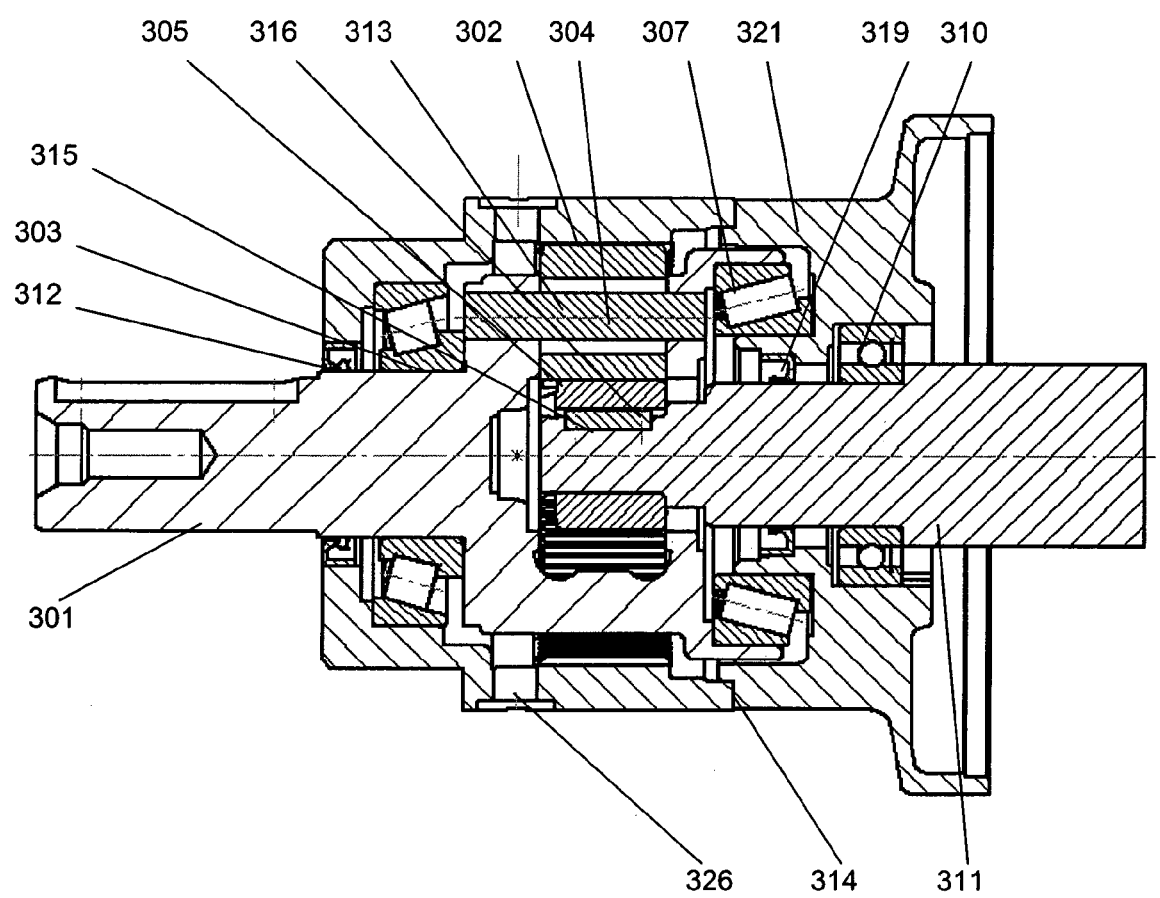
FIG. 3 illustrates the direct attachment of a manufacturer's own electric motor, using a plug-on pinion.

In the case of small gear ratios, e.g., i=3, a plug-on pinion according to FIG. 1 or FIG. 3 is provided as a sun wheel. In the case of large gear ratios, e.g., i=10, a plug-in pinion according to FIG. 2 is provided as a sun wheel. Not all such possible combinations are shown in the figures. However, what is provided within a size of the series are the above-mentioned combinations with a plug-on pinion or plug-in pinion in the gear unit of FIG. 1 having a clutch shaft for attachment of the motor conventional in industry, or combinations with a plug-on pinion or plug-in pinion in the gear unit of FIGS. 2 and 3.

In further exemplary embodiments of the present invention, further sun-wheel-shaft connections are feasible, such as the design of the sun wheel as a plug-on pinion on or to an adaptor, which is connectible on the shaft side, i.e., toward the clutch shaft or the rotor shaft, in accordance with the plug-in pinion. This may always allow the use of the same bore in the shaft and therefore may reduce the number of shafts within a size.

Shown in FIG. 3 is a planetary gear for direct attachment of the above-mentioned, specially adapted electric motors, e.g., a manufacturer's own motors. The plug-on pinion used here may allow the crown-circle diameter of the sun wheel to become larger than the diameter of the shaft sealing ring or bearing. Shaft sealing ring 319 may be detached when it is worn. This may lower costs on the side of the motor.

However, FIG. 1 shows a planetary gear for the attachment of any motor conventional in industry. The diameters of the shaft sealing ring and bearing are positioned on an inner diameter, which may be as small as possible and may result from the plug-in-pinion diameter that may be essentially as small as possible.

In accordance with FIG. 1, an exemplary embodiment of the present invention, which has a plug-in pinion instead of the plug-on pinion shown in FIG. 1, is also provided as an additional variant within the series. In further exemplary embodiments of the present invention, variants may also be constructed, which, instead of the plug-in pinion and the plug-on pinion, include a plug-in plug having an attachable pinion that is inserted into the clutch shaft in accordance with the plug-in pinion.

In FIG. 1, clutch bearing 120 is situated underneath power-takeoff bearing A 107, i.e., is axially positioned in the same region. In FIG. 2, A-bearing 210 of the motor is axially positioned further toward the input side. In further example embodiments of the present invention, the clutch bearing is also situated axially further to the input side in a variant according to FIG. 1. In other example embodiments of the present invention, the A-bearing of the motor is situated below power-takeoff bearing A, i.e., axially positioned in the same region, in a variant according to FIG. 2. The selection of the specific design may be controlled, e.g., by the torque to be transmitted and the diameter consequently dependent on it.

Figure 4:
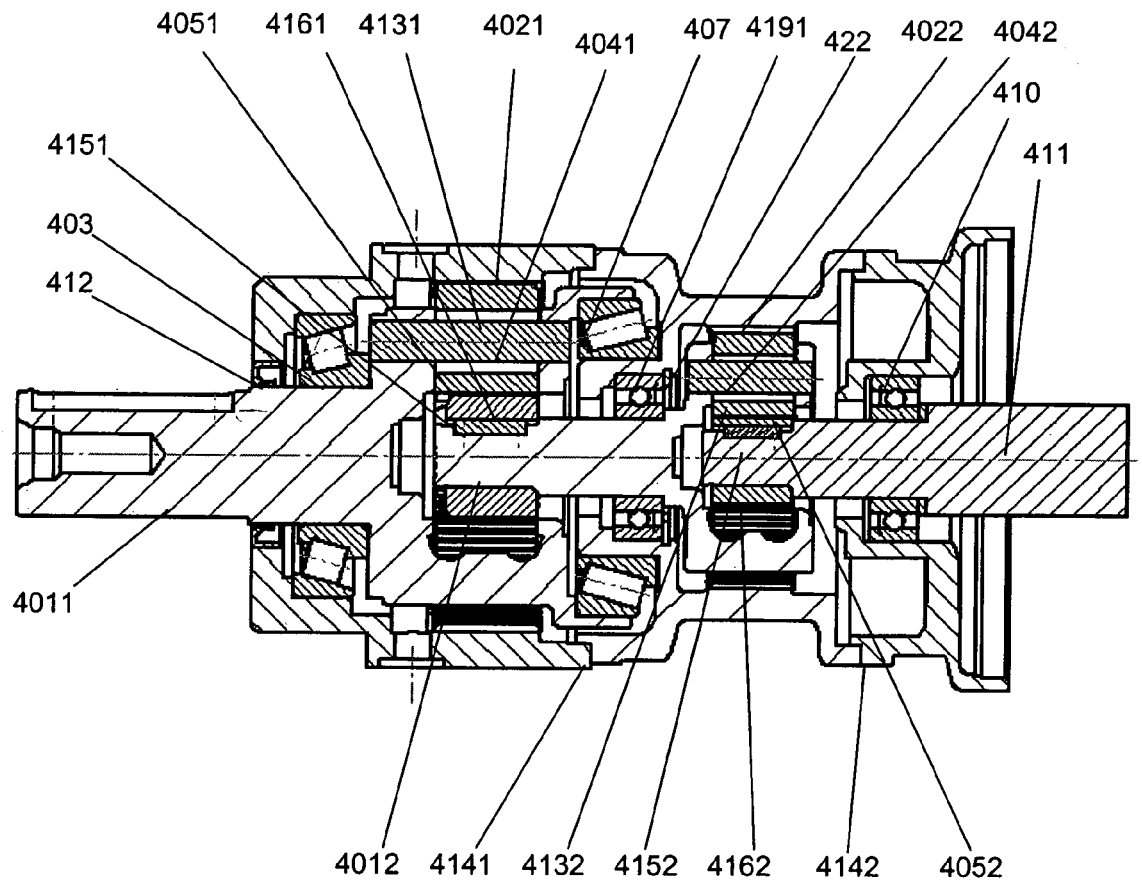
FIG. 4 illustrates the direct attachment of an electric motor, using a plug-on pinion (two-stage).

In FIG. 4, instead of the clutch according to FIG. 1 or the A-end shields according to FIGS. 2 and 3, an additional the gear stage for forming a two-stage planetary gear is connected in series. Electric motors are connectible to this. In the case of small gear ratios, e.g., i≦100, and, e.g., i=16, a plug-on pinion is provided as a sun gear, since, in this case, the crown-circle diameter of the sun wheel may become greater than the diameter of the shaft sealing ring or bearing.

Planet carrier 4011 is supported in gear housing 4021 by power-takeoff bearing A 403, and is driven by planet wheels 4051, which are supported on planet bolts 4041 by planet bearing 4131 and mesh with sun wheel 4161, which takes the form of a plug-on pinion and is connected to planet-carrier shaft 4012 by feather key 4151. Planet carrier 4011 is supported by power-takeoff bearing B 407 in appropriately formed gear housing 4021 of the other gear stage. Gear housing 4022 has the interface that includes sealing location 4141.

Planet carrier 4011 is supported in gear housing 4021 by bearing 4191 and is driven by planet wheels 4052, which are supported on planet bolts 4042 by planet bearing 4132 and mesh with sun wheel 4162, which takes the form of a plug-on pinion and is connected to motor shaft 411 by feather key 4152. Motor shaft 411 is supported by A-bearing 410 of the motor in its A-end shield. This is designed to have the above-mentioned interface that contains sealing location 4142. On the input side and output side, gear housing 4022 has the mentioned interface, which means that the unit construction principal is implementable. In this context, these interfaces are sealed by sealing locations 4141, 4142. Radial shaft seal 412 for the power takeoff is applied or mounted to a reduced diameter. Retaining ring 422 provides locking in the axial direction.

Figure 5:
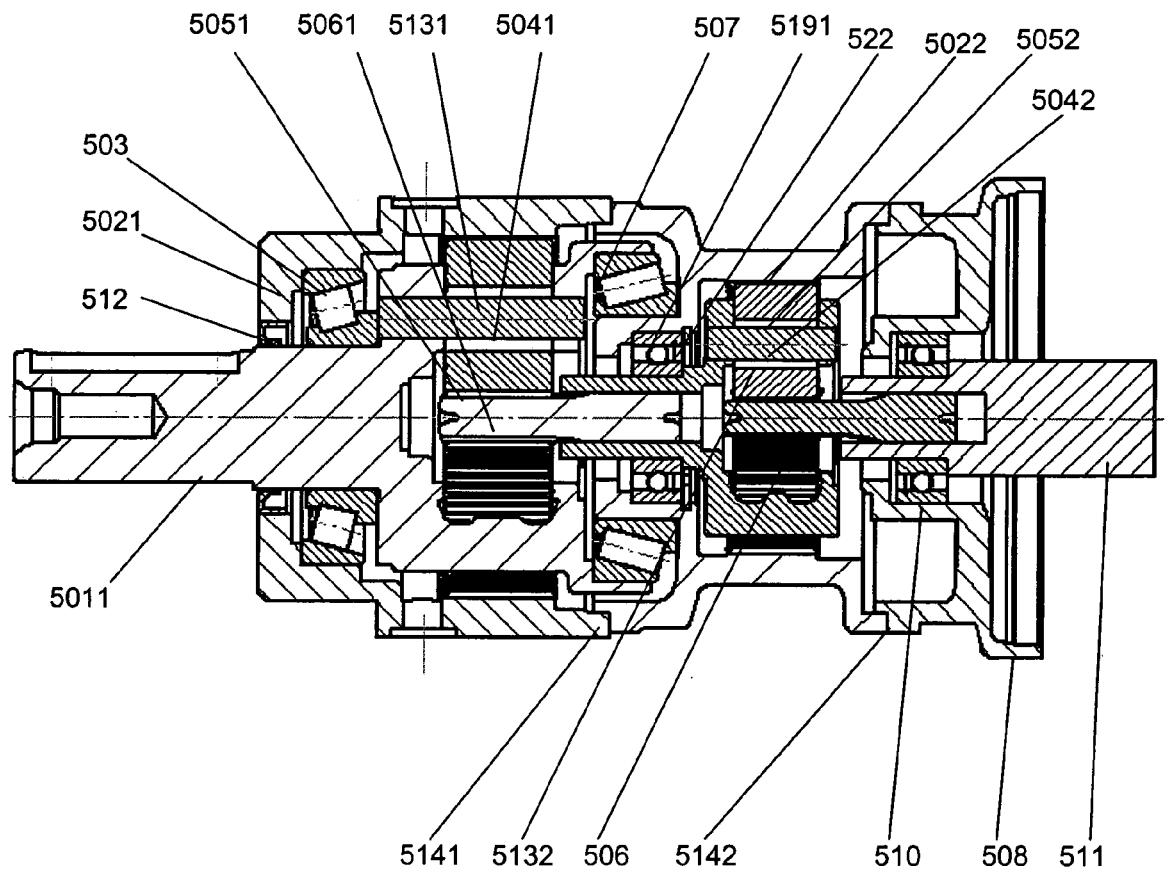
FIG. 5 illustrates the direct attachment of an electric motor, using a plug-in pinion (two-stage).

Such a two-stage planetary gear for the direct attachment of a manufacturer's own electric motors is shown in FIG. 5. A plug-in pinion is provided for large gear ratios, e.g., i≧12 and, e.g., i=100. This is implemented in the two gear stages.

Planet carrier 5011 is supported in gear housing 5021 by power-takeoff bearing A 503 and driven by planet wheels 5051, which are supported on planet bolts 5041 by planet bearing 5131 and mesh with sun wheel 5061, which takes the form of a plug-in pinion and is connectible to planet-carrier shaft 4012 with the aid of a force-locked and/or form-locked connection. Planet carrier 5011 is supported by power-takeoff bearing B 507 in appropriately formed gear housing 5021 of the other gear stage. Gear housing 5021 has the interface that includes sealing location 5141.

The planet-carrier shaft of the additional gear stage, a series stage, is supported in gear housing 5022 by bearing A 5191, and is driven by planet wheels 5052, which are supported on planet bolts 5042 by planet bearing 5132 and mesh with sun wheel 5162, which takes the form of a plug-in pinion and is connected to motor shaft 511 with the aid of a force-locked and/or form-locked connection. Motor shaft 511 is supported by A-bearing 510 of the motor in its a-end shield. This is designed to have the above-mentioned interface that contains sealing location 5142. On the input side and output side, gear housing 5022 has the mentioned interface, which means that the unit construction principal is implementable. In this context, these interfaces are sealed by sealing locations 5141, 5142. Output-side, radial shaft seal 512 provides sealing from the environment. The input-side, radial shaft seal may be attached to a reduced diameter.

During manufacturing, e.g., during the final processing, of the above-mentioned, additional component, such as the planetary-gear stage, the clutch, or the A-end shield of the manufacturer's own electric motor for direct attachment, the bore for the shaft of this component, the bearing seat of the bearing supporting this shaft, the bearing seat for the inner ring of the bearing supporting the planet carrier in the housing part of the further component, and the region of the housing part provided for forming the interface are machined in a clamp, in order to attain as high a manufacturing precision as possible, while keeping costs low. In the case of the planetary-gear stage, the bearing seat for the outer ring of the bearing supporting the planet carrier in the housing part of the planetary-gear stage, and the region of the planetary-gear-stage housing part provided for forming the interface are also machined in a clamp, in order to attain as high a manufacturing precision as possible, while keeping costs low.

On one hand, this mode of processing may be cost-effective, and, on the other hand, it may ensure that the relative positioning of the housing parts and corresponding bearings may be highly accurate. The aspect of the described construction kit, such as the reduction of the variety of parts with a simultaneously large variety of variants, is brought about by coupling the planetary-gear stage to the further components. However, this coupling or interfacing may be accomplished in a highly precise manner. This may be achieved by carrying out the manufacturing or final processing in a clamp. Therefore, certain aspects for the series may only be achievable by specially manufacturing the planetary-gear stage and components.

What is claimed is:

1. A planetary-gear stage, comprising:
   a sun wheel;
   a gear housing including inner gear teeth, the gear housing shaped on an input side as an interface to connect to further components, including at least one shaft connected to the sun wheel;
   a rotatable planet carrier arranged to form a power takeoff;
   a first seal element assigned to the planet carrier on an output side;
   a second seal element arranged on the input side; and
   planet wheels arranged to mesh with the sun wheel and the inner gear teeth of the gear housing, the planet wheels supported in the planet carrier;
   wherein a housing of the further component includes a seat for an inner ring of an input-side bearing, an outer ring of the input-side bearing arranged in the planet carrier.

2. The planetary-gear stage according to claim 1, wherein the further components include at least one of (a) a coupling including a clutch shaft, (b) a clutch including a clutch shaft, (c) an electric motor including a rotor shaft, (d) and a further gear stage including a planet carrier having the form of a shaft in a direction of the planetary-gear stage.

3. The planetary-gear stage according to claim 1, wherein the second seal element is arranged on the shaft and is surrounded by the further component, a diameter of the shaft in a region of the second seal element reduced in comparison with a diameter of the shaft in a region located axially further to the input side.

4. The planetary-gear stage according to claim 3, wherein the region located axially further to the input side corresponds to at least one of (a) a receiving region for a rotor shaft of an electric motor, (b) a region of the rotor shaft in an interior of the electric motor, and (c) a region of a planet carrier in a further gear stage located axially further toward an input side thereof, the planet carrier of the further gear stage arranged as a shaft.

5. The planetary-gear stage according to claim 1, wherein the first seal element is located axially further to a power-takeoff side than an output-side, power-takeoff bearing.

6. The planetary-gear stage according to claim 1, wherein the second seal element is located axially further to the output side than an input-side, power-takeoff bearing.

7. The planetary-gear stage according to claim 1, wherein the planet carrier is supported on the input side by a bearing in the gear housing and is supported on the output side by a bearing in a housing part of the further component.

8. The planetary-gear stage according to claim 1, wherein a bore for the shaft, a bearing seat of a bearing that supports the shaft, a bearing seat for an inner ring of a bearing that supports the planet carrier in a housing part of the further component, and a region of the gear housing that correspond to the interface are configured to be, during manufacture of the further component, machined in a clamp to attain a high manufacturing precision and to maintain low cost.

9. The planetary-gear stage according to claim 1, wherein a bearing seat for an outer ring of a bearing that supports the planet carrier in the gear housing and a region of the gear housing that corresponds to the interface are configured to be, during manufacture of the planetary-gear stage, machined in a clamp to attain a high manufacturing precision and maintain low cost.

10. A gear motor, comprising:
    at least one planetary-gear stage including:
    a sun wheel;
    a gear housing including inner gear teeth, the gear housing shaped on an input side as an interface to connect to further components, including at least one shaft connected to the sun wheel;
    a rotatable planet carrier arranged to form a power takeoff;
    a first seal element assigned to the planet carrier on an output side;
    a second seal element arranged on the input side; and
    planet wheels arranged to mesh with the sun wheel and the inner gear teeth of the gear housing, the planet wheels supported in the planet carrier;
    wherein the at least one planetary-gear stage is connectible to an electric motor to form a gear motor arrangeable as a drive unit; and
    wherein a housing of the further component includes a seat for an inner ring of an input-side bearing, an outer ring of the input-side bearing arranged in the planet carrier.

11. A series of gear motors, comprising:
    at least one size, each size including at least one variant, each variant including at least one electric motor and at least one gear stage, at least one of the gear stages configured as a planetary-gear stage, each gear stage including an interface on an input side, the interface configured to connect to a further component having a corresponding interface on an output side
    wherein the planetary-gear stage includes:
    a sun wheel;
    a gear housing including inner gear teeth, the gear housing shaped on an input side as an interface to connect to further components, including at least one shaft connected to the sun wheel;
    a rotatable planet carrier arranged to form a power takeoff;
    a first seal element assigned to the planet carrier on an output side;

a second seal element arranged on the input side; and
planet wheels arranged to mesh with the sun wheel and the inner gear teeth of the gear housing, the planet wheels supported in the planet carrier, a housing of the further component including a seat for an inner ring of an input-side bearing, an outer ring of the input-side bearing arranged in the planet carrier.

12. The series of gear motors according to claim 11, wherein the further component includes one of (a) a gear stage, (b) a clutch, and (c) an electric motor.

13. The series of gear motors according to claim 11, wherein in each variant, a sun wheel in the planetary-gear stage is connected on the input side to a shaft of the further component by one of (a) a plug-in pinion and (b) a plug-on pinion as a function of a gear ratio.

14. The series of gear motors according to claim 11, wherein in one variant, the electric motor is arranged to have a different interface on the output side and is connectible to a gear stage by a clutch of the further component.

15. The series of gear motors according to claim 14, wherein the different interface of the electric motor of the one variant includes an interface standardized according to one of (a) NEMA and (a) IEC.

16. The series of gear motors according to claim 14, wherein the electric motor of the one variant includes a standard conventional motor.

17. A planetary-gear stage, comprising:
at least two sun wheels;
a gear housing including inner gear teeth, the gear housing shaped on an input side as an interface to connect to further components, including at least one shaft connected to at least one of the sun wheels;
a rotatable planet carrier arranged to form a power takeoff;
a first seal element assigned to the planet carrier on an output side;
a second seal element arranged on the input side; and
at least two sets of planet wheels, each of the at least two sets having at least two wheels, each of the of planet wheels arranged to mesh with at least one of the sun wheels and the inner gear teeth of the gear housing, the planet wheels supported in the planet carrier;
wherein a housing of the further component includes a seat for an inner ring of an input-side bearing, an outer ring of the input-side bearing arranged in the planet carrier.

18. The planetary-gear stage according to claim 17, wherein the second seal element is arranged on the shaft and is surrounded by the further component, a diameter of the shaft in a region of the second seal element reduced in comparison with a diameter of the shaft in a region located axially further to the input side.

* * * * *